United States Patent [19]

La Russa

[11] 4,045,116

[45] Aug. 30, 1977

[54] WIDE ANGLE OPTICAL IMAGING SYSTEM

[76] Inventor: Joseph A. La Russa, 451 Rutledge Drive, Yorktown Heights, N.Y. 10598

[21] Appl. No.: 553,870

[22] Filed: Feb. 27, 1975

[51] Int. Cl.² .......................................... G02B 13/06
[52] U.S. Cl. ....................................... 350/21; 350/54; 350/55; 350/198
[58] Field of Search ................. 350/54, 55, 21-24, 350/198

[56] References Cited

U.S. PATENT DOCUMENTS

| | | | |
|---|---|---|---|
| 2,146,662 | 2/1939 | Albada | 350/21 |
| 3,229,576 | 1/1966 | Rees | 350/198 X |
| 3,432,219 | 3/1969 | Shenker et al. | 350/198 X |
| 3,459,465 | 8/1969 | Rosin et al. | 350/50 X |
| 3,514,186 | 5/1970 | Poncelet | 350/198 X |
| 3,580,660 | 5/1971 | La Russa | 350/55 X |
| 3,639,034 | 2/1972 | La Russa | 350/50 X |
| 3,655,260 | 4/1972 | Bartucci et al. | 350/50 X |
| 3,904,289 | 9/1975 | Yager | 350/55 X |

*Primary Examiner*—David H. Rubin
*Attorney, Agent, or Firm*—Burgess, Dinklage & Sprung

[57] ABSTRACT

An optical system, commonly referred to as an Optical probe in the simulation art, that views either a two dimensional or a three dimensional model in the scale of the model world and then images the view remote from the model to television cameras of real world scale. The two dimensional model viewed is an orthographic projection from a perspective free, full color strip film. The system can view either a front or a rear screen projection. When viewing the projection from any scale eye height, the device introduces the proper perspective with vanishing points from the scale eye height for the television pick-up cameras. The invention can also be used with solid three dimensional models to perform the same function.

9 Claims, 8 Drawing Figures

ENLARGED VIEW OF FOCAL PLANE

EQUAL SPACING IN FOCAL PLANE FOR EQUAL ANGLES IN FIELD OF VIEW

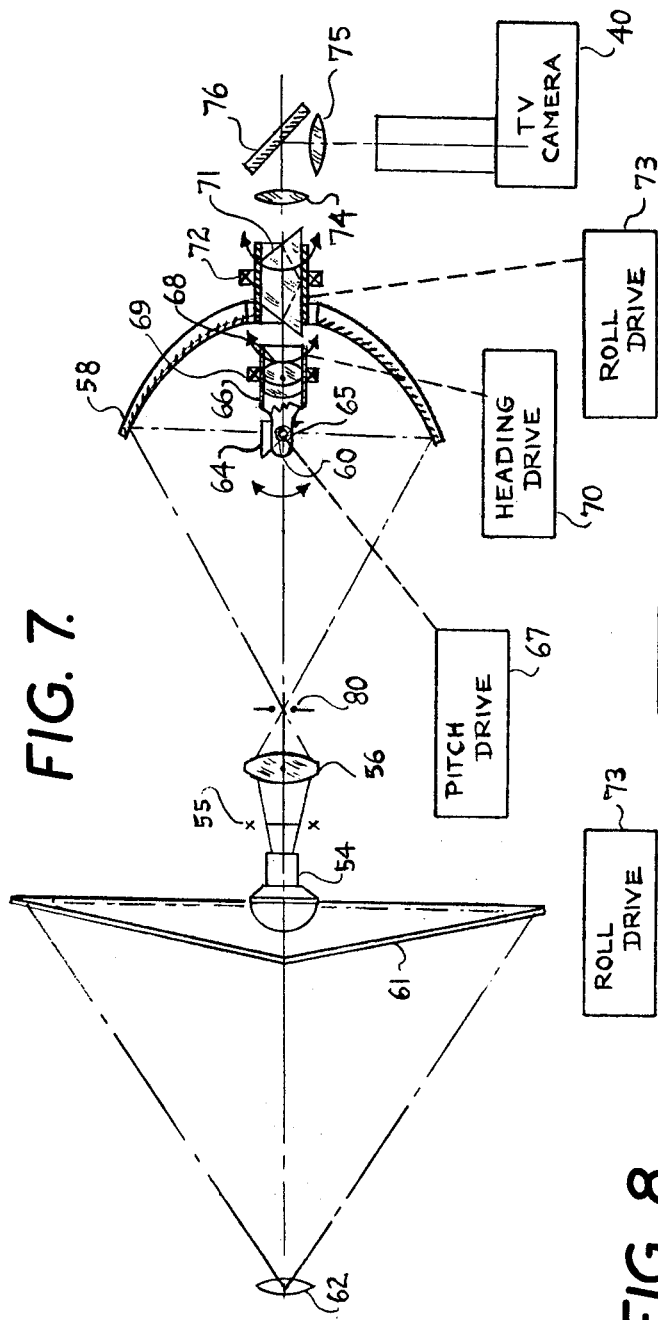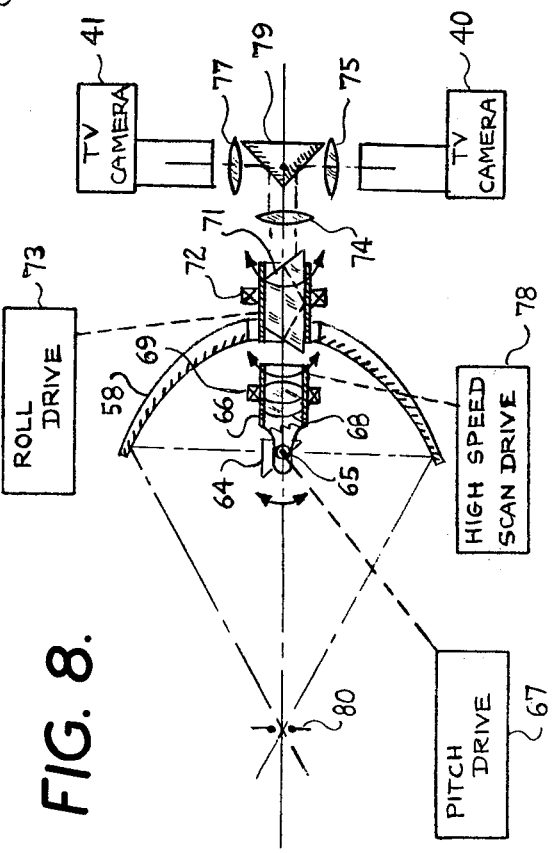
FIG. 7.
FIG. 8.

WIDE ANGLE OPTICAL IMAGING SYSTEM

BACKGROUND OF THE INVENTION

This invention relates to an optical component in the field of image generation systems such as are frequently used in aircraft and other simulators employing visual outputs. In simulators of the aircraft variety, for example, pilots observe a visual output which is a simulated view of the real world from their flight path.

The simulated view is typically produced from a small scale model of the real world with a closed circuit television system viewing the model world from the scale flight path through an optical probe that is passed or "flown" over the model.

An improved method for producing a simulated view is taught by my prior U.S. Pat. Nos. 3,580,660 and 3,639,034 both of which relate to the use of full color strip film to provide a two dimensional terrain model which contains no perspective but does employ aspect to add a three dimensional appearance to the simulated view. Perspective and aspect may be defined as follows:

1. Perspective is the phenomenon which causes rectangular objects to appear as trapezoidal objects. Stated another way, perspective is the phenomenon which causes lines which are parallel to appear to run to a vanishing point. When the observer's eyepoint changes in vertical, lateral or longitudinal translation or in any combination from the point of photography, then, of course, the perspective must also be changed.

2. Aspect is the phenomenon which identifies the viewing angle of objects. For example, the phenomenon of aspect makes a cube appear to have three sides when the viewing angle is looking toward one corner of the cube or makes a cube appear to have only one side when the viewing angle is normal to the side. Three dimensional aspect exists when three sides of a cube or other solid object can be seen.

The strip film image generator utilizes strip film without perspective but with the aspect as seen approximately 30° down from the horizon. Perspective is regenerated optically. The reason for regenerating perspective continuously can be appreciated when one considers that the perspective view of any object at a distance varies as the observer translates his viewpoint with respect to said object. Hence, when the optical viewing system is translated over the projection of that portion of the strip film which represents the terrain surrounding the observer or vice versa, the true perspective from the observer's nadir to every point in his field of view will be regenerated. This perspective regeneration and optical relay of the observer's view to a television camera is accomplished by an optical system which is the subject matter of this invention.

The advantages of a full-color strip film image generation system have been enumerated and explained in my U.S. Pat. No. 3,639,034. It should be understood, however, that this invention is an improvement over the perspective regeneration system and film viewing optics of U.S. Pat. No. 3,639,034, and it also embraces a second strip film of weather effects in close proximity to the terrain strip film as in my earlier patent. This invention also contemplates the use of an overall image generation system and strip film rationale as disclosed in U.S. Pat. No. 3,639,034.

Because the present invention constitutes a true perspective viewing system providing views free from distortion, it is a very economical optical probe for viewing three dimensional models.

Prior probes used in simulation systems suffer many limitations such as the employment of very small entrance pupils to effect large depth of focus with the result that tremendous amounts of illumination must be poured onto the model. Even these small pupil probes do not fulfill the focus requirements. Another type of probe called the "tilt focus probe" using the Scheimpflug effect has been designed and used. Even this probe suffers from lack of illumination, and more importantly, from a lowered contrast rendition due to the number of glass elements that must be employed. Scheimpflug probes are also not able to focus very well on vertical prominences that protrude from the object plane such as tall buildings and mountains.

Prior optical probes have had limited fields of view (the widest field of view optical probe known has a 140° circular field and was fabricated as a Scheimpflug probe). The present perspective regeneration system or probe overcomes the limited field restriction and supplies an instantaneous full hemisphere of view. The device maintains every point in the hemisphere in good focus from nadir to horizon around the full 360° in azimuth while providing a high contrast rendition and is not limited in the focussing of large vertical objects. These features are achieved by the present invention at a closeness of approach of the probe to the screen or model of zero elevation, that is, the front optical element can actually be in contact with either screen or model.

SUMMARY

The present invention provides an optical imaging system that reproduces a very wide field of view in a configuration that allows an observer or viewing device to be immersed in the field of view at a pupil which reproduces the view in true angles. The optical imaging system includes:

i. image producing means;
ii. wide angle objective lens means adapted to view the image producing means through approximately a 180° field of view, 360° in azimuth about the optical axis of the objective lens means;
iii. relay lens adapted to reproduce the aerial image from the objective lens means focal plane in a second aerial focal plane;
iv. means positioned beyond said second aerial focal plane to redirect and approximately collimate divergent rays from image points in the second aerial focal plane thereby forming a pupil; and means to view the collimated image produced at said pupil.

DESCRIPTION OF THE DRAWINGS

FIG. 7 depicts the present invention schematically illustrating optical principles and drives required to achieve the three degrees of rotational freedom.

FIG. 8 illustrates an alternated embodiment of the present invention designed to view and to relay to multiple television cameras a full 360° azimuthal view.

DESCRIPTION

The present invention can be applied to either an optical image generation system using a curved screen and strip film as an input or the optical imaging system may be used to view a three-dimensional model directly. When used as an image generation system employing strip film, the optical imaging system views perspectiveless objects as provided by the film which have aspect and then provides an image having both aspect and perspective to a television camera or cameras.

When using strip film it is necessary for the optical imaging system to view a limited expanse of film imagery and therefore so as not to suffer a lack of resolution, two strip films of different scale are used to provide a total view from the nadir to 1° below the horizon around a full 360° in azimuth.

Figure 2:
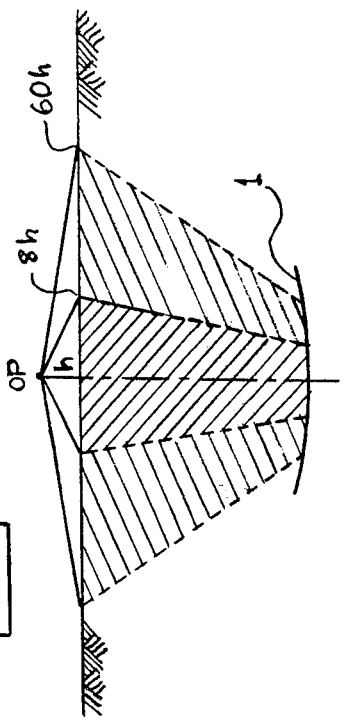
FIG. 2 depicts the separate fields of view contained on the two strip films and projected onto a single screen as used in the present invention.

Referring to FIG. 2 we see that the observer's eye point (OP) is a distance $h$ above the ground. The total circular area supplied by one strip film ranges from the nadir out to, for example, $8h$ and this area of terrain on the strip film is projected by optical means onto the conical screen 1. The dividing point of $8h$ is arbitrarily based on resolution requirements.

The remaining annulus of terrain from $8h$ to $60h$ is also projected onto the screen 1. This projection onto screen 1 will be an annular projection of a scale suitable to cover the terrain from $8h$ to $60h$. The sum of the two projections, therefore, represents a model of the terrain as photographed without perspective from 0 to $60h$.

Figure 1:
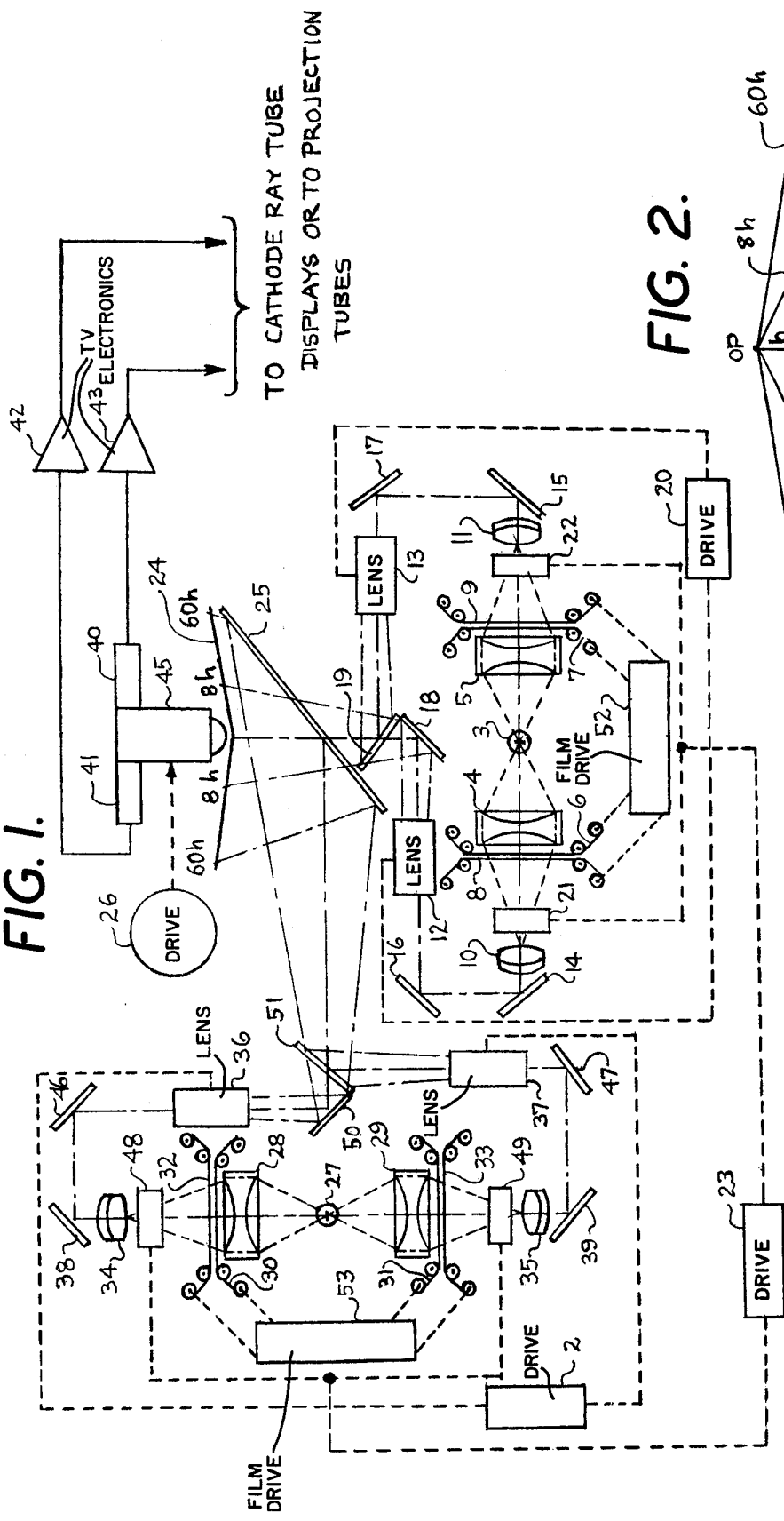
FIG. 1 depicts an overall block diaphragm of a visual simulator apparatus in accordance with and utilizing the present invention.

A typical design for one embodiment of the invention where the optical imaging system is used with strip film and the screen is shown in FIG. 1. Here single light sources 3 and 27 and condensing systems 4 and 28 are used to illuminate terrain strip films 6 and 30 as well as weather effects strip films 8 and 32 so that collimating lenses 10 and 34 can supply screen 24 with images representing terrain from 0 to $8h$ and from $8h$ to $60h$ respectively by means of varifocal lenses 12 and 36, mirrors 14, 16 and 18 and 38, 46 and 50 and beamsplitters 19 and 51. The screen 24 is then viewed in turn by television cameras 40 and 41 of which there may be a plurality dispersed about the optical imaging system output in order to view the total 360° azimuth of imagery while providing adequate resolution. The television cameras feed appropriate closed circuit TV electronics 42 and 43 whose outputs are directed to the required displays. This view from each of as many as six cameras, for example, can be fed into any type of wraparound display by either a screen or an infinity type of display so that a centrally located observer would view a full 360° hemisphere of terrain.

The same light sources 3 and 27 illuminate a duplicate set of films 7 and 9 and 31 and 33 representing views of terrain from 0 to $8h$ and from $8h$ to $60h$ respectively and suitably scaled weather effects films. These duplicate films, however, are of the next or succeeding scale to permit switching from films 6, 8 and 30, 32 to films 7, 9 and 31, 33 during projection to simulate altitude variation beyond the capability of the varifocal lenses as taught in U.S. Pat. No. 3,639,034. This leapfrogging of strip film scales using the varifocal lenses 12, 36 and 13, 37 and diaphragms 21, 48 and 22, 49 can be performed to either climb or descend in altitude.

The diaphragms are used to switch from one set of films to the other unnoticeably by increasing the illumination in one set of films while decreasing the illumination in the other set until the switch has been accomplished. This transition by illumination variation is achieved through a calibrated diaphragm drive system 23. Note that both sets of films are projected to the same size on the screen 24 and the images are exactly superposed while the switch is going on.

This switch of projection from one set of films to the other occurs prior to one set of varifocal lenses running out of magnification range at a given film scale allowing the introduction of the second film scale at a minified varifocal magnification to permit zooming of this second projection by the second set of varifocal lenses.

To continue increasing the apparent elevation or decreasing the apparent elevation the transition from this set of films in use to another set of yet a different scale is again conducted in a similar manner. This procedure as well as the geometry and scales required of the strip films are taught in my previous U.S. Pat. No. 3,639,034.

It should be noted from FIG. 1 that longitudinal and lateral translation of the observer over the terrain film is accomplished by driving the strip films in accordance with aircraft velocities and film scales by drives 52 and 53. Altitude variation is achieved by varifocal lenses 12 and 13 and 36 and 37 through drives 20 and 2. Roll, pitch and heading effects are achieved by drives 26 which are located within the optical imaging system 45.

Figure 3:
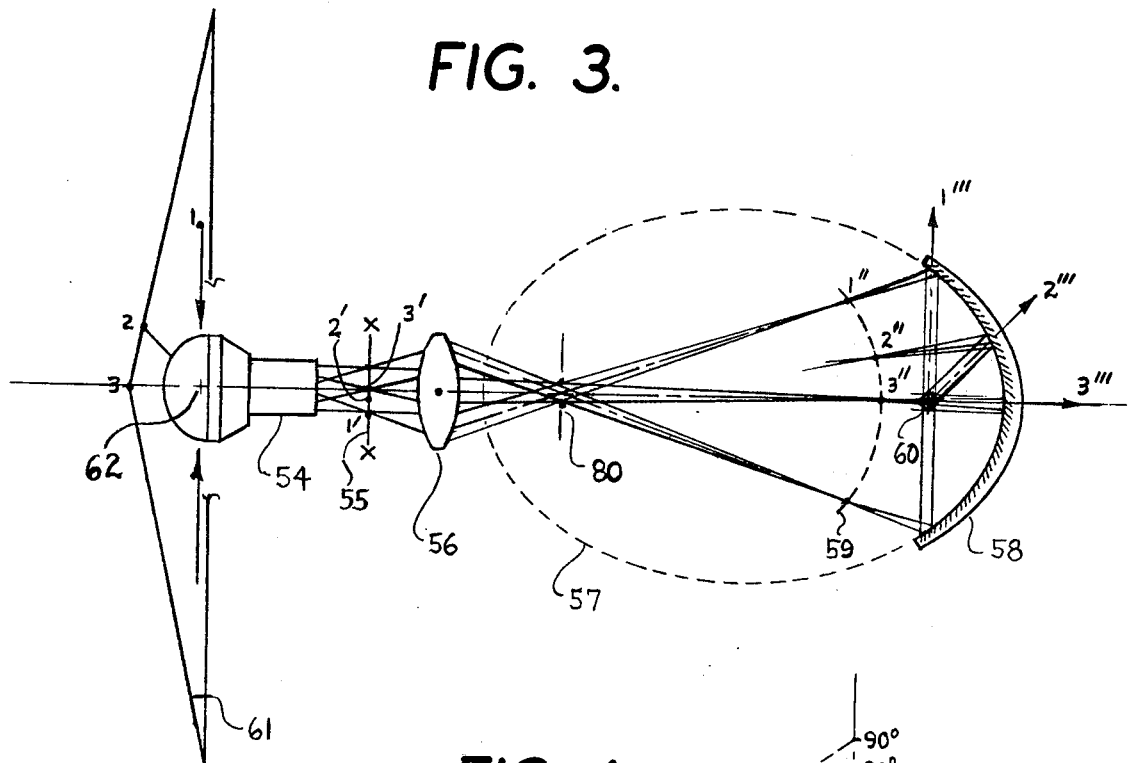
FIG. 3 illustrates the optical and geometrical principles of the present invention.

FIG. 3 shows schematically an optical arrangement utilizing a wide field of view lens (180°) 54, a relay lens 56 and a reflector 58. The wide field of view lens 54 is commonly called a Fish-eye lens which may be typically a Nikkor lens of 7.5 mm focal length whose aperture is adjustable from F/5.6 to F/22 and whose image plane size is 23 mm in diameter. Such lenses produce what appears to be a distorted image at focal plane 55.

Figure 4:
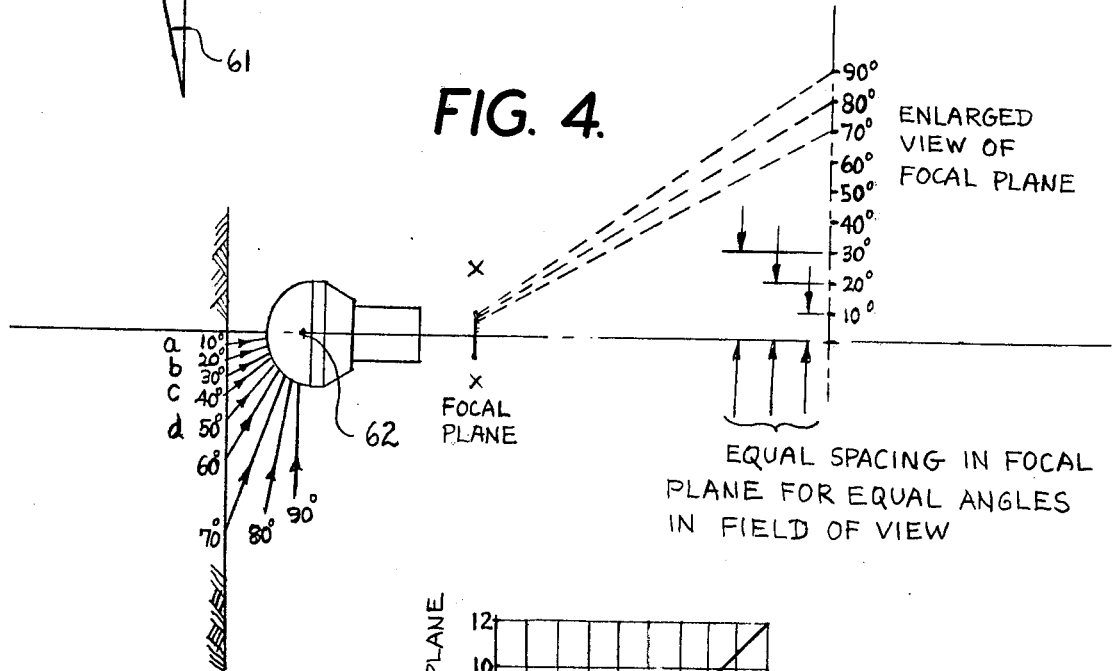
FIG. 4 illustrates the typical performance of a wide field of view lens employed in the present invention.
Figure 5:
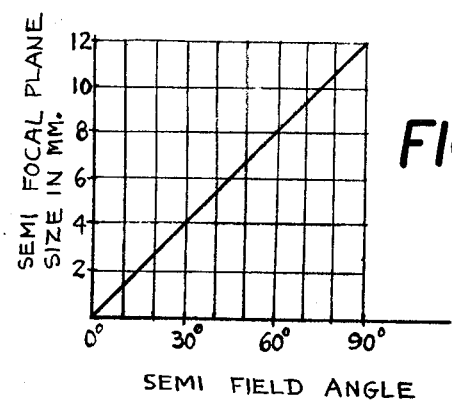
FIG. 5 illustrates the mapping function of the wide field of view lens illustrated in FIG. 4.

This image can best be described by referring to FIG. 4 where the focal plane spacing of equal angles on the viewing side is depicted as linear displacements all of which are rotationally symmetric. In other words, at the viewing point of the lens or at its nodal point 62, equal viewing angles as shown in FIG. 4 will see different and increasing expanses of terrain $a,b,c,d$, etc., and these will be plotted in the focal plane as equal distances. This relationship of terrain length viewed through equal angles to the corresponding length in the focal plane is known as the mapping function of the lens. The mapping function of the Nikkor lens referred to previously is illustrated in FIG. 5.

Although the image produced by such wide angle lenses appears to be distorted when viewing focal plane 55 in FIG. 3, there is a distance from the focal plane at which the image does not appear distorted. This distance is always too short for an observer to properly locate his eye. This invention thus permits an observer or some sensing means to view the field of 180° fish-eye lens or any other wide field of view lens as if the observer were actually within the lens at the nodal point or at the correct distance from the focal plane of the lens. The total undistorted solid angular field of view is thus instantaneously available to the observer or to any sensor.

In order to reconstruct this extremely wide field viewed by the objective lens 54 via a mirror such that the total field may be viewed by an observer or pick-up device without distortion and at the same time reproduce directions as viewed from the nodal point of the lens in true angles one must generate a pupil 60 that is optically accessible.

As an example, if we employ a conical screen 61 (FIG. 3) on which there is projected a terrain view and if we concern ourselves with directions from the objective lens nodal point 62 to ground points 1, 2 and 3 representing angles of 30°, 60° and 90° respectively from the nadir we must reproduce images of these points at pupil 60 in the proper directions, that is, at angles 30°, 60°, and 90° from the nadir. The objective lens 54 reproduces points 1, 2 and 3 in focal plane 55 as points 1', 2', and 3' spaced in accordance with the mapping functions illustrated in FIG. 5. The bundle of rays forming each image point in the focal plane will diverge and enter the aperture of the relay lens 56. The relay lens will in turn image these points in an aerial focal plane 59 as shown. The aerial focal plane will ideally be of a backward curving nature as for example would be available through the use of a Minolta MC VFC-Rokkor 24 mm F/2.8 lens which has a variable field curvature which is adjustable from positive to negative.

Each aerial image point 1", 2" and 3" has associated with it the angular bundle of rays forming each point and this angular bundle will diverge for each point beyond the focus of points 1", 2", 3", etc. If beyond the focus point we use a reflective surface to redirect and approximately collimate the divergent bundle of rays, a pupil 60 will be formed. The reflective surface 58 must be designed such that the principle ray associated with each point in question (1", 2" and 3") will be reflected to a common point.

A preferred method for achieving these results is described by the invention. Referring to FIG. 3, the pupil of objective lens 54 should be imaged onto the pupil of the relay lens 56 in order to provide the maximum transmission of illumination within the optical imaging system. If we now select an ellipsoid for the reflector 58 the projected pupil of relay lens 56 should be superposed on one of the foci 80 of the ellipsoid 58. In this manner all of the principle rays from all image points in focal plane 55 passing through focus 80 of the ellipsoid will be reflected by the sectional ellipsoid to pass through the other focus 60 by definition. Now each image point in aerial focal plane 59 will be formed by a converging bundle of rays on the relay side of focal plane 59, said bundles of rays diverging on the reflective ellipsoid side of focal plane 59. Since all rays in each bundle will appear to emanate from the projected pupil of relay lens 56 superposed on focus 80 of the ellipsoid, and since the pupil will be of reasonably small size, all of said rays will be reflected by the sectional ellipsoid to pass through or in the close vicinity of its conjugate pupil 60 in accordance with the property of an ellipsoid. Pupil 60 will be of the same approximate size as pupil 80 and all of the rays passing through pupil 60 will be approximately collimated.

To persons skilled in the art, it will be evident that by proper selection of the following variables: (a) focal length of relay lens 56, (b) operating conjugates of relay lens 56 and (c) eccentricity and size of ellipsoid 58, it is possible to exactly reconstruct the angles to all points in the field of view of lens 54 at the pupil 60 of the sectional ellipsoid. The present invention, therefore, reproduces a very wide field of view as seen by a typical fish-eye lens in a configuration that allows an observer or a pick-up device to be immersed in the field of view at a pupil providing said field of view in true angles.

The reflective surface 58 although described as an ellipsoid may actually range from an ellipsoid to a paraboloid providing one selects the variables of relay lens 56 focal length, curvature of the aerial focal plane and the eccentricity of the reflecting surface appropriately.

Figure 6:
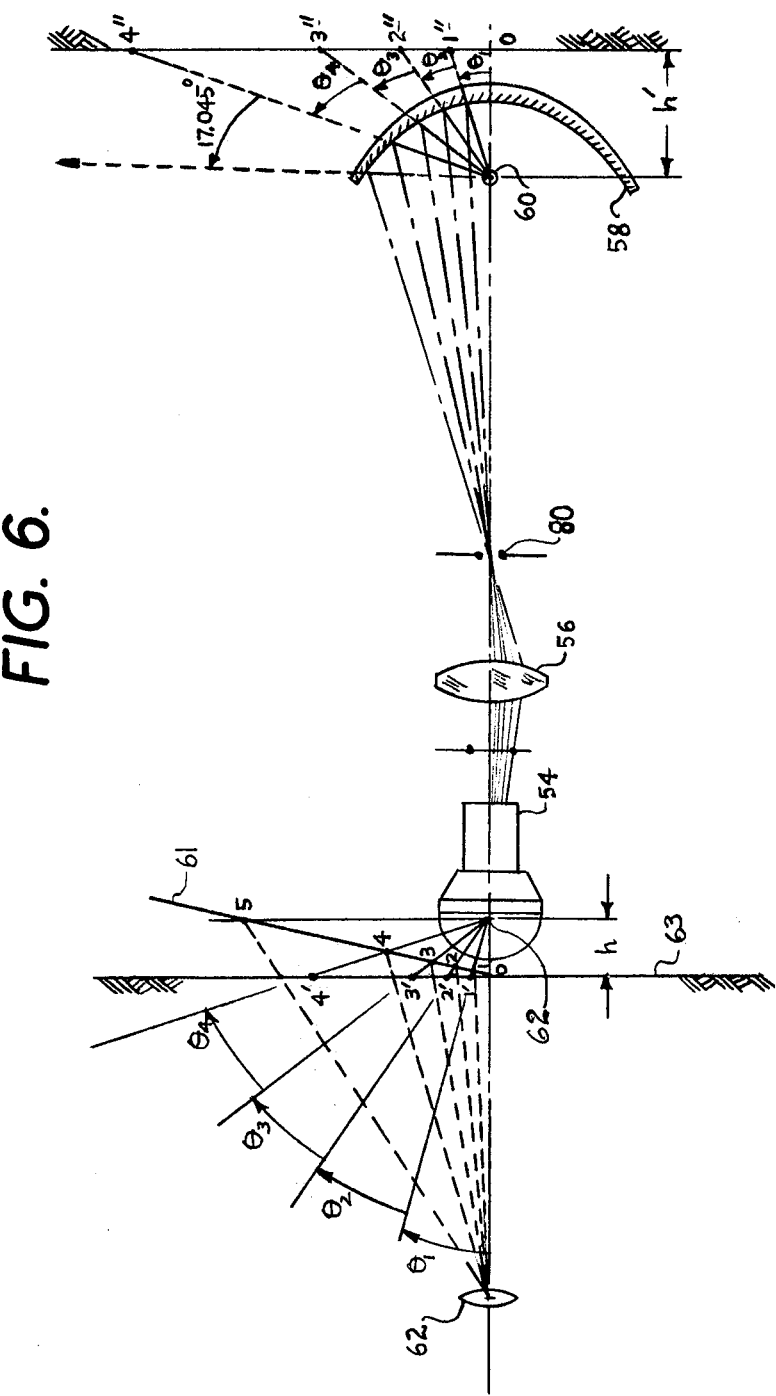
FIG. 6 illustrates the geometrical requirements of the present invention for effecting the desired outputs.

FIG. 6 illustrates the geometrical requirements of the strip film projection lens and the conical screen in order that the view provided to lens 54 would be the same as if lens 54 were viewing a ground plane extending to infinity instead of viewing a limited size screen 61. If the optical imaging system is used to view a three-dimensional model of large extent, then the field of view would look like the real world. In that case equal angles viewed by the lens in the real world, $\theta_1$, $\theta_2$, $\theta_3$, $\theta_4$, etc., would be reproduced at the viewing pupil 60 correctly by virtue of the optical system described. If we employ the optical imaging film projection on a limited size screen 61 we must still provide the same 180° field of view from simulated horizon to simulated horizon through the nadir. For this purpose it is necessary to provide a conical screen 61 such that the 180° field of view lens 54 can be immersed in the cone so that the horizon rays are visible to the lens from the edge of the screen as for example point 5. If we consider plane 63 as the real world ground plane, and, if the nodal point of the viewing lens were located at a distance $h$ above said ground plane, the points 1', 2', 3', 4' and 5' would represent ground distances for equal angles of $\theta$ in a tangent ratio such that point 1', $\theta_1$° up from the nadir would be $h \tan \theta_1$ distant from the nadir point (the radial height from the optical axis). Thus, the lens 54 will view point 1 on the screen as if it were point 1' on the ground plane. Likewise, lens 54 will view points 2, 3, 4, etc., on the screen as if they were points 2', 3', 4' etc., on the ground plane. This desirable fore-shortening effect will be obtained by projecting ground points 1', 2', 3', 4' etc., to the lesser radial heights of the conjugate points 1, 2, 3, 4, etc. on the screen. Lens 62 therefore is preferably a compressor type projection lens. Such lenses are well known and can be readily designed and produced to provide the desired function required.

FIG. 7 illustrates the optical layout required in order to view the optical image provided by the invention in a manner such that pitch, roll, and heading could be supplied to the television camera. Reflector 58 which provides the real world view to pupil 60 has a hole cut through its nadir area in one embodiment in order to allow extraction of the viewed image. In an alternate embodiment beamsplitters may be used to provide uninterrupted viewing from horizon to horizon. At pupil 60 there is located a pitch scanning prism 64 mounted to a pitch bearing 65 which is in turn supported by frame 66. Frame 66 contains relay lens 68 and the complete assembly is supported in bearing 69. The collimated rays exiting from relay lens 68 pass through a derotating prism 71 which is supported in bearing 72. This prism provides roll about the line of sight by rotating the prism in bearing 72 through the roll drive 73. The bundle of rays rotated by prism 71 is reflected by mirror 76 and focused by lenses 74 and 75 onto the photocathode of a television camera 40. This optical system will provide a limited horizontal field of view related to one or more television cameras. The extent of the horizontal field of view will be limited by the field that can be accommodated through prism 64 although a total hemispherical field of view is available from reflector 58. In order to provide apparent changes in heading the 360° azimuthal field of view available from reflector 58 is scanned by rotating prism 64 in bearing 69 by actuating heading drive 70. In the case where a total field of 360° in azimuth is required, the pitch prism 64 and relay lens 68 are driven in bearing 69 at a rotational speed sufficiently high to provide a continuous field of view to television camera 41 and other cameras displaced in azimuth as required.

FIG. 8 illustrates the scan drive 78 used to rotate prism 64 and relay lens 68 at the required scanning speed to relay the full hemispherical view from reflector 58 through derotating prism 71 and onto the photocathodes of television cameras 40, 41 and others by means of imaging lenses 74, and 75 and 77 through reflection off of a fixed multi-faceted pyramidal mirror 79. This pyramidal mirror will have as many facets as are required to feed the number of television cameras provided. Also lenses 75 and 77 will be duplicated for any other pairs of television cameras employed.

The wide angle objective lens 54 is preferably a so-called "fish-eye" lens. Such lenses are available with a field of view in the range of 90° through to 220°.

The collimated image produced at pupil 60 is produced by principal rays from the relay lens aerial focal plane 59. These rays are directed to pass through pupil 60 by the reflector 58. The total diameter of pupil 60 is effectively produced by bundles of rays associated with the diverging rays from each image point in aerial focal plane 59 which strike reflector 58 as a divergent bundle as shown in FIG. 3. Reflector 58 is adapted to redirect the bundles of divergent rays in collimated fashion through pupil 60. The reflector 58 is preferably ellipsoid as described, but other shapes that will function in the same or similar manner, e.g., paraboloid, can also be used.

Relay lens 56 should have a large enough aperature to accept and pass all of the rays from objective lens 54.

The collimated image produced at pupil 60 can be viewed by an observer at a relayed pupil which means that the imaging system of the invention can be adapted for use as a wide angle viewing instrument.

What is claimed is:

1. Optical imaging apparatus for viewing two- or three-dimensional models and remotely imaging the view comprising
   i. image producing means;
   ii. wide angle objective lens means for viewing the image producing means through approximately a field of view in the range of 90°-220°, 360° in azimuth about the optical axis of said objective lens means, said objective lens means producing a distorted aerial image, commonly referred to as fish-eye distortion, at the focal plane thereof;
   iii. relay lens means adapted to reproduce the distorted aerial image from the objective lens means focal plane in a second aerial focal plane;
   iv. concave reflector means generally ellipsoidal and of an eccentricity such that the pupil of said relay lens means and the pupil of said reflector means are both at the foci of said reflector means which are positioned beyond said second aerial focal plane, said reflector being of such a size and shape that all of the principal rays from all image points in the distorted aerial image produced by the wide angle objective lens means and corresponding divergent rays from image points in the second aerial focal plane which reproduces the distorted aerial image are redirected and the divergent rays are approximately collimated towards the pupil of said reflector means thereby forming an optically accessible pupil conjugate to the pupil of the objective lens means which produces an approximately collimated image which corresponds to the entire field of view of the objective lens means in true angles, free from distortion which permits, in effect, viewing the external world from the pupil of the objective lens means which is totally inaccessible and which is the only point through which the external world can be viewed without distortion and with true perspective; and
   v. optical means to relay the collimated image produced at the pupil of said reflector means to an accessible viewing location.

2. Apparatus of claim 1 wherein the objective lens means is a fish-eye of lens having a 180° field of view, 360° in azimuth about the optical axis of the objective lens means.

3. Apparatus of claim 1 wherein the relay lens means reproduces the aerial image from the objective lens means focal plane in a second, backwardly curving, aerial focal plane.

4. Apparatus of claim 1 wherein the collimating means is an ellipsoid reflector.

5. Apparatus of claim 1 wherein the redirected, collimated rays pass through pitch scanning means adapted to rotate about the pupil of said reflector means.

6. Apparatus of claim 5 wherein the pitch scanning means has associated therewith heading drive means to provide apparent changes in heading.

7. Apparatus of claim 5 wherein the pitch scanning means is adapted to rotate at a speed sufficient to provide a continuous field of view to the viewing means.

8. Apparatus of claim 1 wherein the collimated image passes through derotating prism means adapted to rotate about the line of sight to the pupil of said reflector means.

9. Apparatus of claim 1 wherein the viewing means is one or more television cameras.

* * * * *